US007673927B2

(12) United States Patent  (10) Patent No.: US 7,673,927 B2
Brockhoff et al.  (45) Date of Patent: Mar. 9, 2010

(54) VEHICLE WITH HORIZONTALLY-PIVOTABLE TAIL GATE

(75) Inventors: Franz-Ulrich Brockhoff, Bramsche (DE); Winfried Bunsmann, Bissendorf (DE); Jochen Klein, Münster (DE); Wolfgang Nentwig, Emsbüren (DE); Markus Grave, Lienen (DE)

(73) Assignee: Wilhelm Karmann GmbH, Osnabruck (DE)

( * ) Notice: Subject to any disclaimer, the term of this patent is extended or adjusted under 35 U.S.C. 154(b) by 631 days.

(21) Appl. No.: 11/403,023

(22) Filed: Apr. 12, 2006

(65) Prior Publication Data

US 2006/0279108 A1    Dec. 14, 2006

(30) Foreign Application Priority Data

Apr. 15, 2005  (DE) .................. 10 2005 017 444
Sep. 12, 2005  (DE) .................. 10 2005 043 581

(51) Int. Cl.
  *B60J 5/10*  (2006.01)
(52) U.S. Cl. ................. 296/146.11; 296/50; 296/146.8; 362/501; 362/541
(58) Field of Classification Search .......... 296/50, 296/56, 57.1, 152, 146.8, 146.9, 146.11; 362/496, 501, 505, 541; 293/117; D12/86, D12/196
See application file for complete search history.

(56) References Cited

U.S. PATENT DOCUMENTS 4,629,244 A * 12/1986 Tiesler ............... 296/146.11
5,842,770 A * 12/1998 Gold ..................... 362/487
5,876,086 A *  3/1999 Lagrou et al. ......... 296/146.11
6,152,502 A * 11/2000 Rossi ..................... 292/347
6,196,617 B1 *  3/2001 Beck .................... 296/146.11
7,244,054 B2 *  7/2007 Chou .................... 362/501
2002/0167188 A1 * 11/2002 Zagaroff ................ 296/57.1
2004/0124223 A1    7/2004 Riemer et al.
2006/0001288 A1 *  1/2006 Thiele et al. ............. 296/50
2007/0063586 A1    3/2007 Neidlein
2007/0145773 A1 *  6/2007 Saitoh ................... 296/146.8

FOREIGN PATENT DOCUMENTS

DE         31 03 323       8/1982
DE         296 00 660      6/1997
DE         19860556        7/1999
DE         198 49 915      5/2000
DE         198 57 385      6/2000
DE         203 04 381      7/2003
EP          0 785 330      7/1997
FR           2688824       9/1993
WO          98/46442      10/1998
WO      WO 2005/027279    3/2005

OTHER PUBLICATIONS

06006643 European Search Report, 4 pages, Dated Aug. 21, 2008.

* cited by examiner

*Primary Examiner*—Jason S Morrow
(74) *Attorney, Agent, or Firm*—Michael Best & Friedrich LLP

(57) ABSTRACT

In a motor vehicle having a tail gate (10) affixed to a lateral, rear pillar of the vehicle structure by means of at least one hinge so as to be pivotable about a substantially vertical axis (A-A), a hinge part that swings out together with the tail gate is located in an area of a lateral tail light (18) of the vehicle when the tail gate (10) is closed.

13 Claims, 18 Drawing Sheets

VEHICLE WITH HORIZONTALLY-PIVOTABLE TAIL GATE

CROSS-REFERENCE

This application claims priority to German patent application no. 10 2005 043 581.5, filed Sep. 12, 2005, and German patent application no. 10 2005 017 444.2, filed Apr. 15, 2005, both of which are fully incorporated by reference herein.

TECHNICAL FIELD

The present invention concerns a motor vehicle having a tail gate and more preferably, a tail gate that is affixed to a lateral, rear pillar of the vehicle structure by means of at least one hinge so as to be pivotable about a substantially vertical axis.

BACKGROUND ART

Personal motor vehicles having a large luggage space, which is further enlargeable if necessary by folding the rear seats, are enjoying increased popularity. In order to make it easier to load the available versatile luggage space, such motor vehicles include a rear trunk lid and/or tail gate that is pivotable about a substantially horizontal axis; the rear trunk lid or the tail gate can be divided in the middle and supported above and below on the vehicle structure. In the alternative, one or possibly two tail gates can be provided that is/are supported on the vehicle structure so as to be pivotable about a substantially vertical axis.

However, tail gates that are pivotable about vertical axes typically limit the design possibilities, because, e.g., when the shape significantly encroaches into the area of the rear window, hinges can only be disposed in the area of the gate body under the vehicle midline. The height of the gate body is limited by the distance between the lower edge of the rear window and the upper edge of the rear bumper. In addition, tail lights are disposed in this area, which tail lights must fulfill various legal regulations.

SUMMARY OF THE INVENTION

The object underlying the invention is to provide a motor vehicle having an improved tail gate. In one aspect of the present teachings, the improved tail gate may be affixed to a lateral, rear pillar of the vehicle structure by a hinge so as to be pivotable about a substantially vertical axis. Such a construction offers broad freedoms with respect to the design possibilities.

In one aspect of the present teachings, the hinge preferably provides the connection to the vehicle body so as to permit the tail gate to be pivotable about a substantially vertical axis. A hinge part of the hinge preferably pivots or swings out together with the tail gate and is located in the area of a lateral tail light of the vehicle when the tail gate is closed.

In further embodiments of this aspect, the tail gate is preferably affixed to the vehicle structure by means of only one hinge. In addition or in the alternative, the tail light may be fully contained in the hinge part that pivots or swings out together with the tail gate. In addition or in the alternative, the hinge part that pivots or swings out with the tail gate may be a frame surrounding the tail light in the closed state of the tail gate, the tail light being affixed to the vehicle. In addition or in the alternative, the hinge part connected with the tail gate may form a part of the tail light.

Furthermore, in such embodiments, the motor vehicle may include a tail light on the hinge side of the tail gate, which tail light is freely visible from the rear when the tail gate is opened.

According to the above-noted aspects and embodiments, a hinge part connected and/or swinging out with the tail gate (another hinge part is connected with a lateral, rear pillar of the vehicle structure) is preferably located in the area of a lateral tail light or forms itself the lateral tail light or a part thereof. It is possible that the tail light disposed in the area of the hinge will, generally speaking, be covered when the tail gate is opened, so that a further tail light, which will not be covered when the tail gate is opened, must be provided on the hinge side to satisfy legal requirements. However, the great advantage of the inventive construction is that broad freedoms are opened up to the designer and in addition, the tail gate can be supported on the vehicle in a manner that achieves a relatively large loading breadth.

In another aspect of the present teachings, a motor vehicle may include a tail gate affixed to a lateral, rear pillar of the vehicle structure by at least one first hinge so as to be pivotable about a substantially vertical axis. The motor vehicle may also include a lateral tail light that is affixed by at least one second hinge so as to be pivotable on the tail gate or the lateral, rear pillar of the vehicle structure.

In addition, the tail light may be affixed to the lateral, rear pillar by the at least one second hinge so as to be pivotable about a substantially perpendicular axis. In addition or in the alternative, the at least one second hinge may be coupled with the first hinge or a third hinge of the tail gate by a connecting device, such that the pivotal movement of the tail light is actuated by the pivoting of the tail gate.

According to such aspects and embodiments, the tail light or a part thereof is not affixed to the hinge part belonging to the tail gate hinge, but rather is pivotable by means of its own hinge. Like the above-described aspects and embodiments, according to this embodiment of the motor vehicle, a hinge part of the tail gate hinge, which pivots or swings out together with the tail gate, is also preferably located in the area of a lateral tail light of the vehicle when the tail gate is closed.

Additional objects, features and advantages of the present teachings will be readily understood to a person of ordinary skill in the art after reading the following detailed description of examples and embodiments of the present teachings together with the claims and the accompanying drawings.

DETAILED DESCRIPTION OF THE PREFERRED EMBODIMENTS

Figure 1:
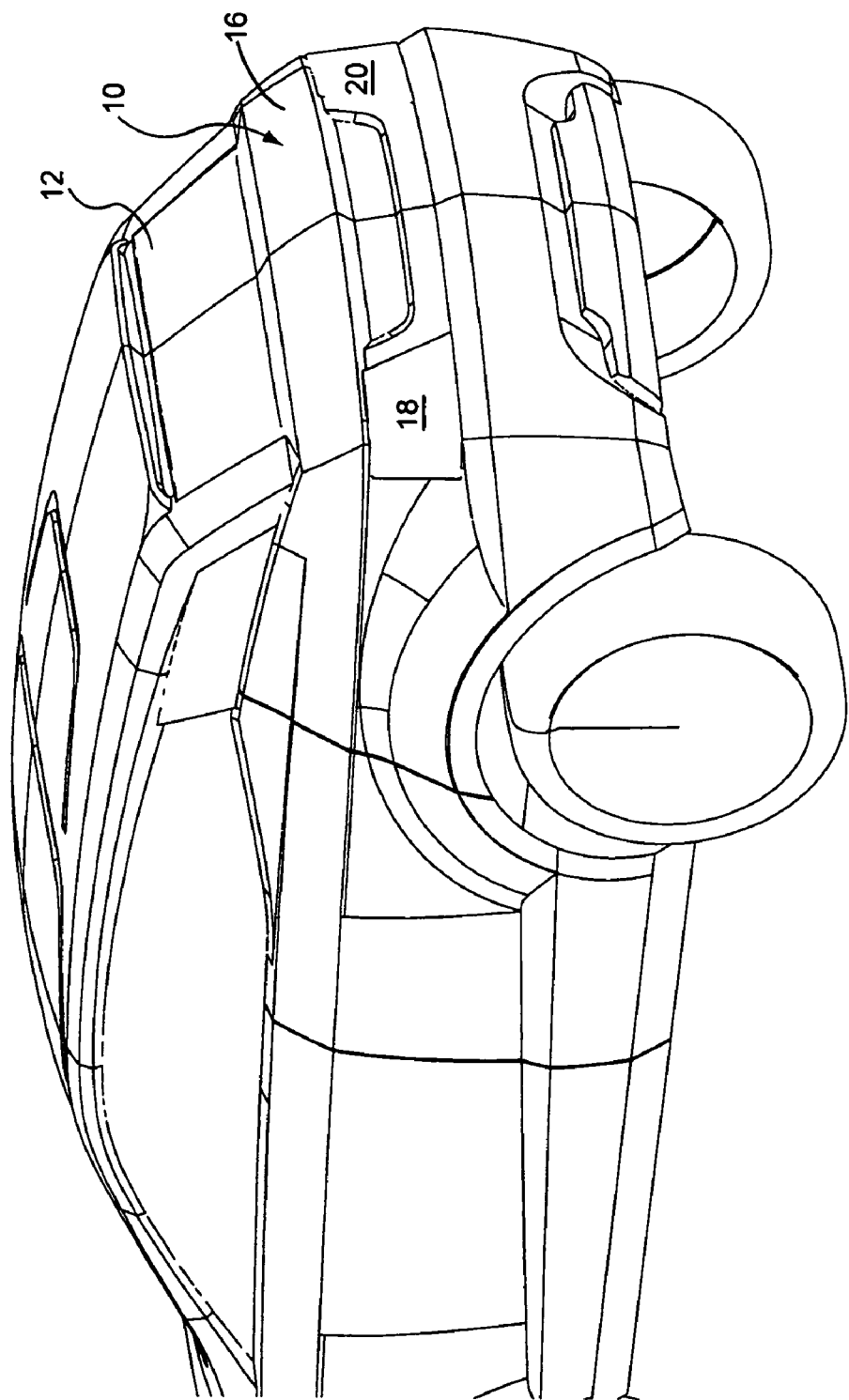
FIG. 1 to 15 show different views of various embodiments of inventive motor vehicles.
Figure 2:
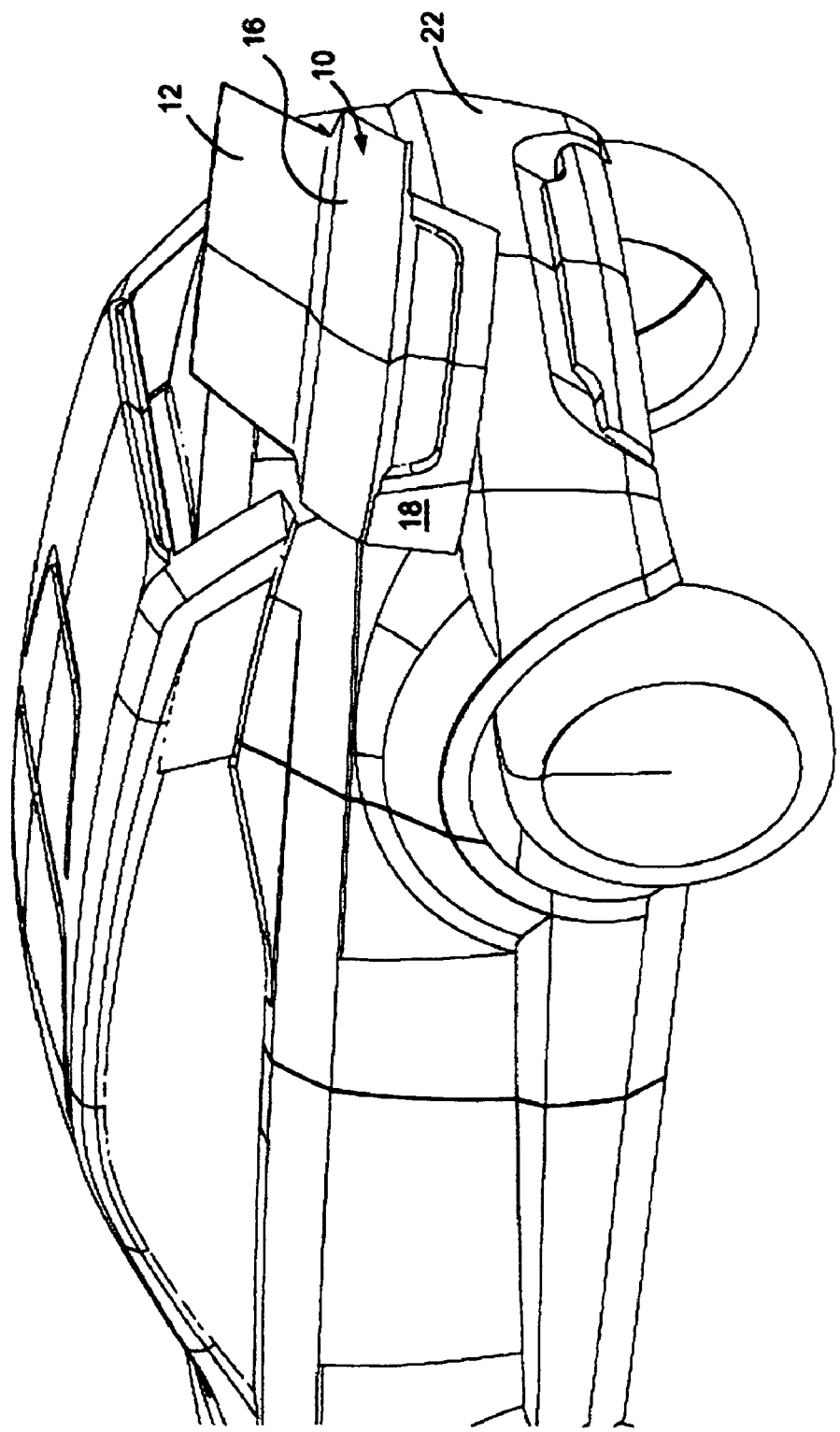

A first embodiment is illustrated in FIGS. 1 and 2, wherein FIG. 1 shows a view at an angle from the rear of a motor vehicle with a closed tail gate and FIG. 2 shows the vehicle according to FIG. 1 with an opened tail gate.

According to FIGS. 1 and 2, a motor vehicle designed as a station wagon includes a gate 10 on its rear side. The gate is affixed on the left side of the vehicle to a rear, lateral (side) pillar (not shown in FIGS. 1 and 2) of the vehicle structure so as to be pivotable about a substantially vertical axis. As is apparent, the rear side of the vehicle above the vehicle midline is forwardly inclined in and/or significantly encroaches into the area of the rear window 12. Moreover, a rear bumper and/or its outer covering extend(s) relatively high, so that the height of the intrinsic gate body 16 is relatively small. In addition, lateral (side) tail lights 18 and 20 are disposed in the area of the gate body 16. Consequently, there is scarcely any space available for hinges, by which hinge(s) the tail gate 10 is borne (pivotably supported) on the vehicle body and/or the rear pillar on the left side. The present teachings provide a solution to this problem by disposing the hinge in the area of the left tail light 18, as is clearly shown in FIG. 2.

The construction of hinges, which is not illustrated in detail in FIGS. 1 and 2 (see below for greater construction details of a preferred hinge), that may be readily utilized with the present teachings may include known hinge designs or inventive hinge designs and preferably includes a hinge part fixedly connected with the rear left pillar of the vehicle structure; this hinge part is pivotably connected with another hinge part that preferably is fixedly connected with the tail gate 10 and/or the gate body 16. As is apparent from FIG. 2, the tail light 18 is affixed to the hinge part connected with the tail gate and/or is fully integrated in this hinge part. Consequently, the left tail light 18 swings out (pivots) with the tail gate when the tail gate is opened, whereas the right tail light 20 is affixed to the vehicle.

As is further apparent from FIG. 2, the left tail light 18 is no longer visible from the rear when the tail gate is opened, which may be inconsistent with certain legal requirements. In order to overcome this potential problem, a further tail light (not shown) may be, e.g., accommodated in the bumper covering 22 on the left side, which further tail light is visible from the rear when the tail gate is opened and includes light chambers and lights for fulfilling the corresponding legal requirements. In the alternative, a further tail light can be provided in the right-sided gate side of the tail gate 10 so as to be visible according to FIG. 2. Such further tail light may be automatically turned ON when opening the tail gate as soon as the tail light 18 is no longer visible from the rear, so that all the relevant legal requirements are fulfilled.

Figure 3:
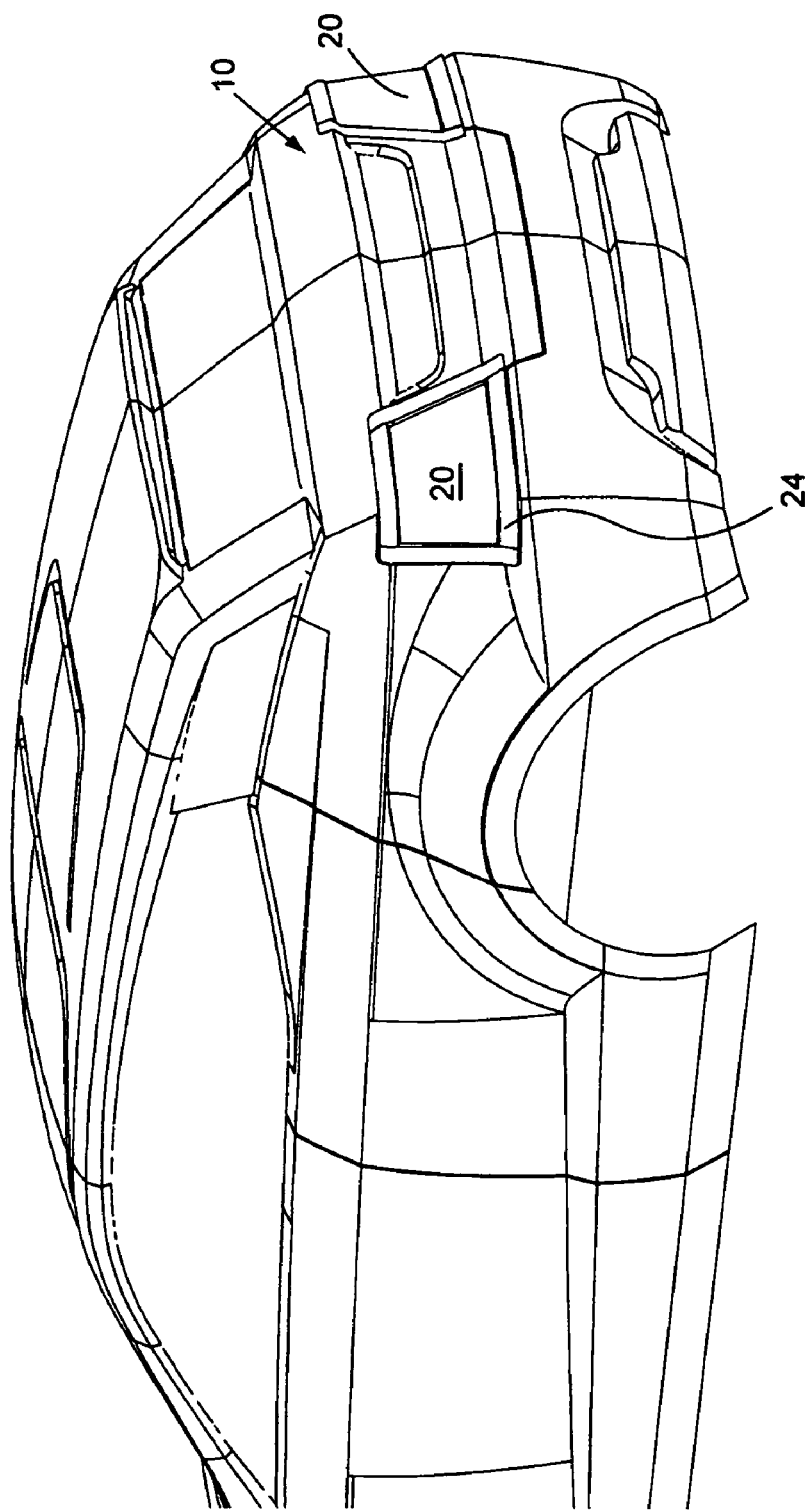
Figure 4:
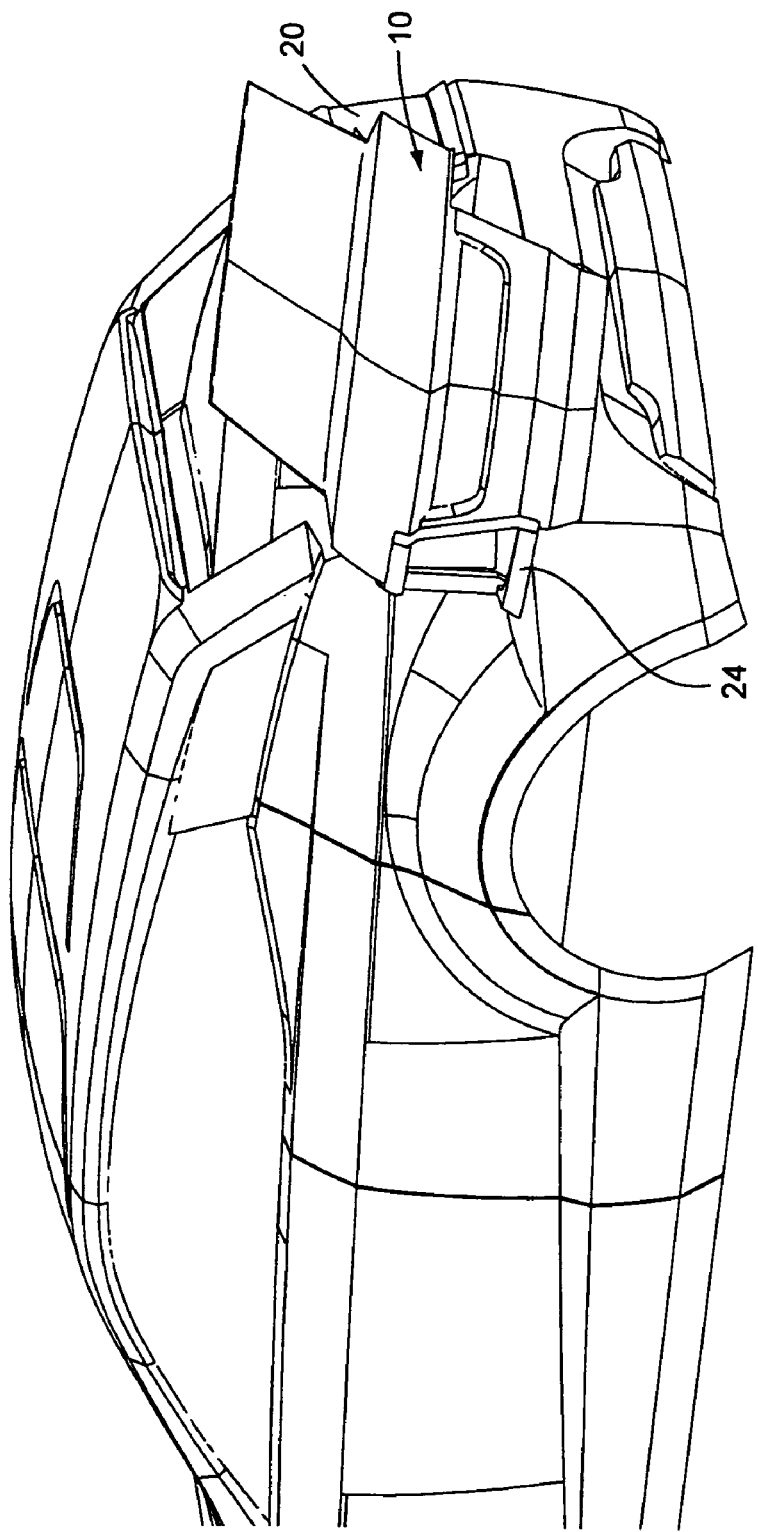

The tail light 18 forms a part of the hinge part connected with the tail gate in the embodiment according to FIGS. 1 and 2. On the other hand, the tail light 20 with its housing, the light chambers and the lights, which is affixed to the vehicle in the embodiment according to FIGS. 3 and 4, is surrounded by a frame 24 that at least partially surrounds the light 20 in the closed state of the tail gate 10 and preferably forms the hinge part fixedly connected with the tail gate 10.

Figure 5:
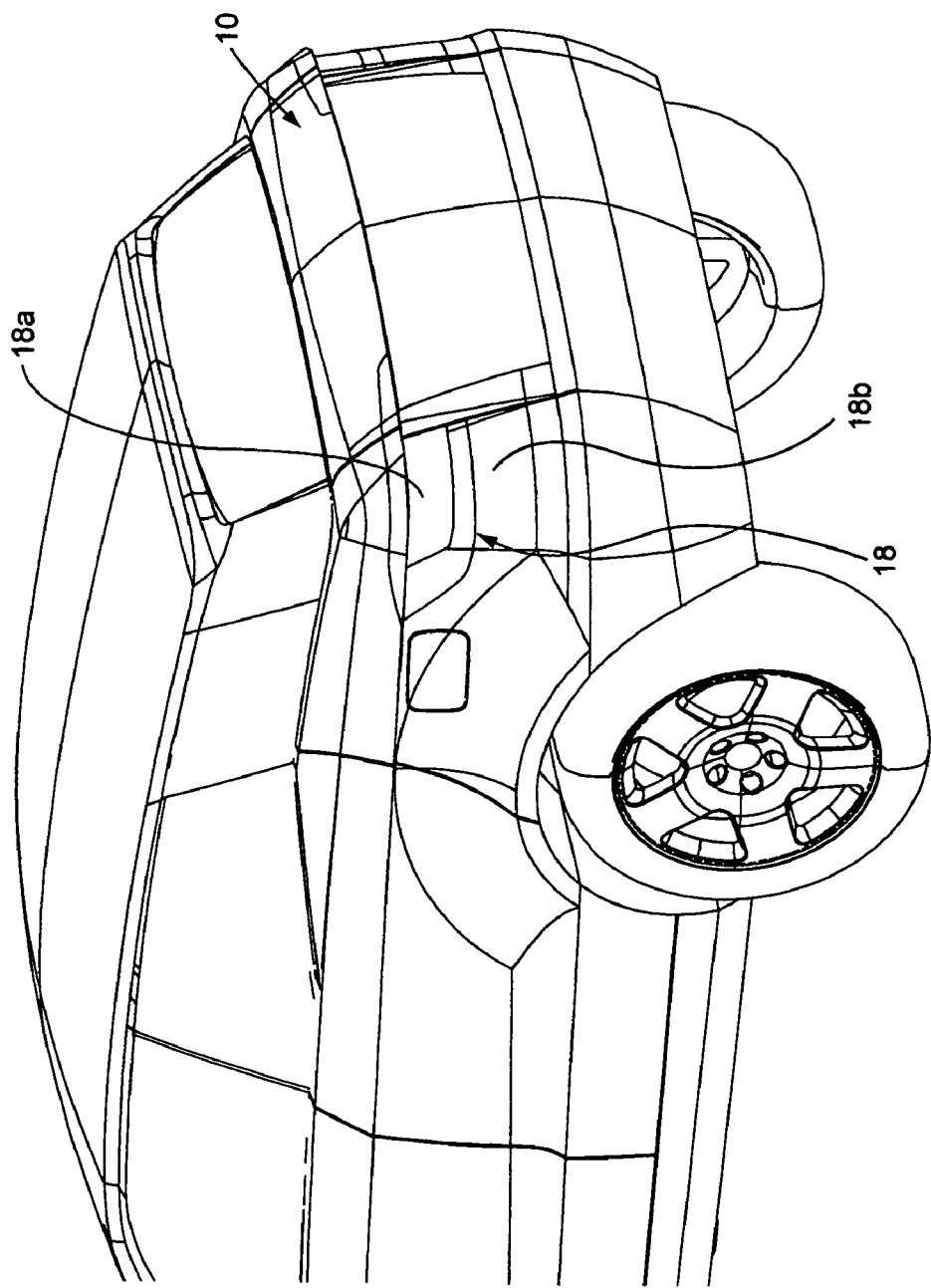
Figure 6:
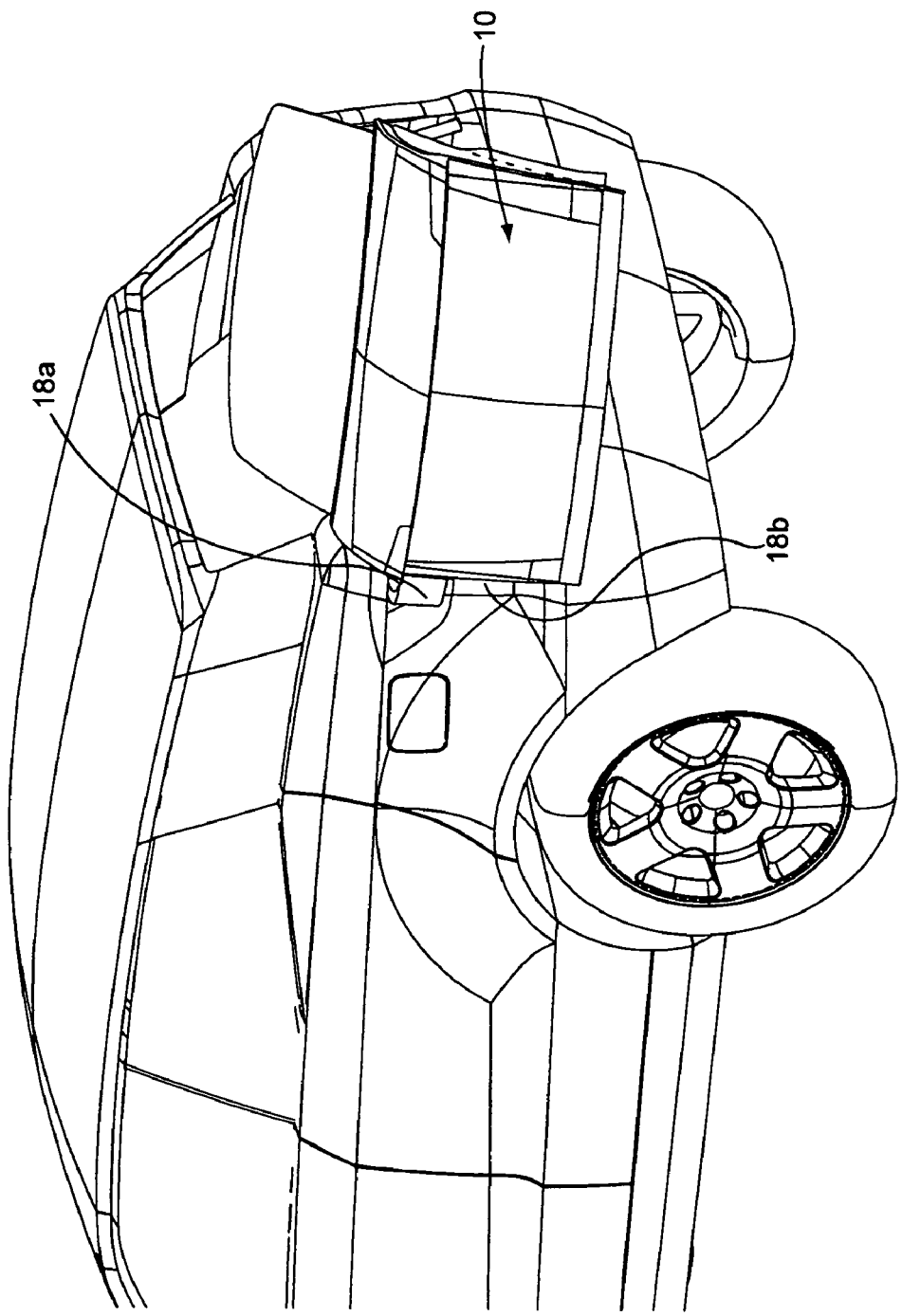
Figure 7:
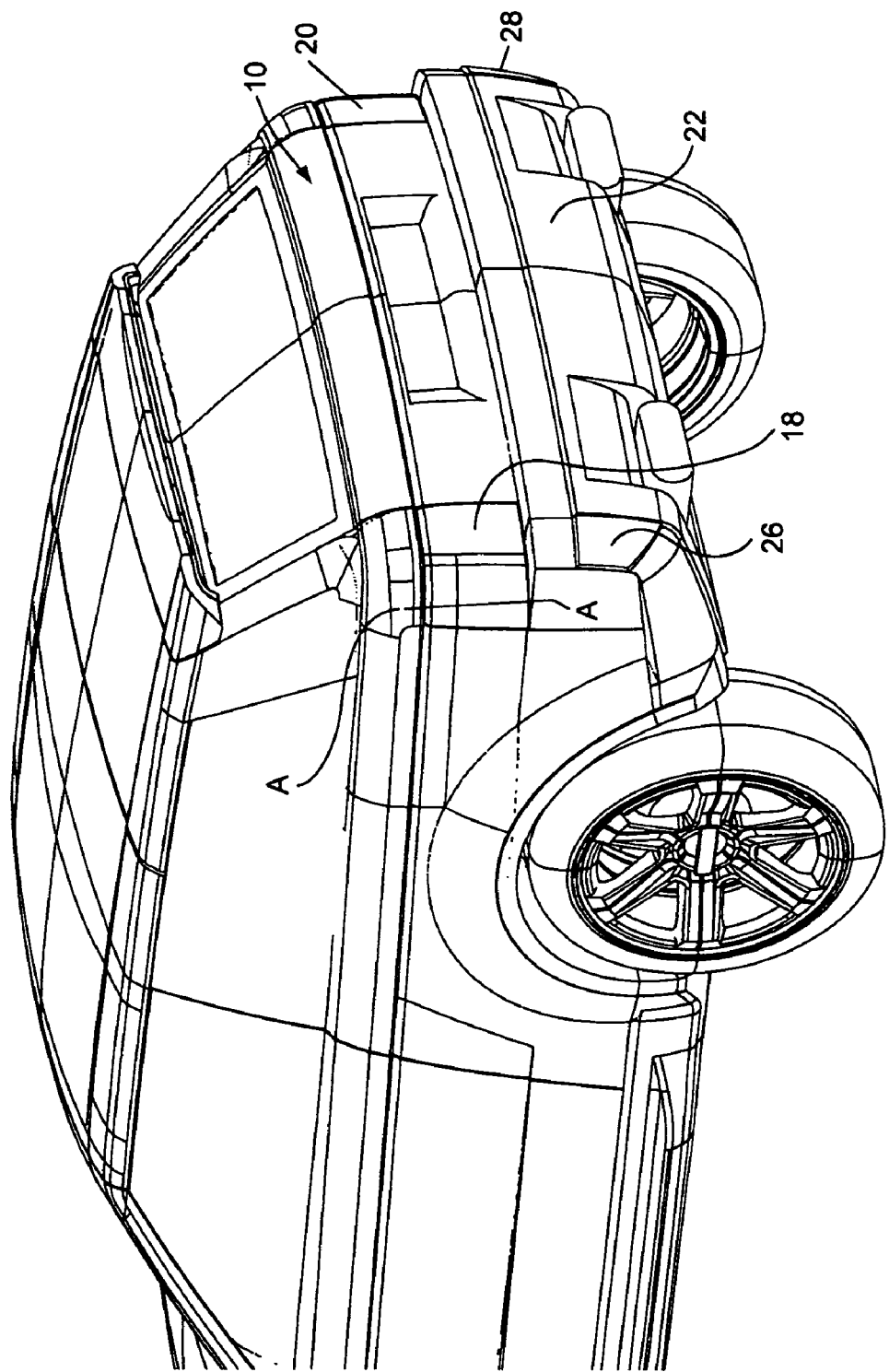
Figure 8:
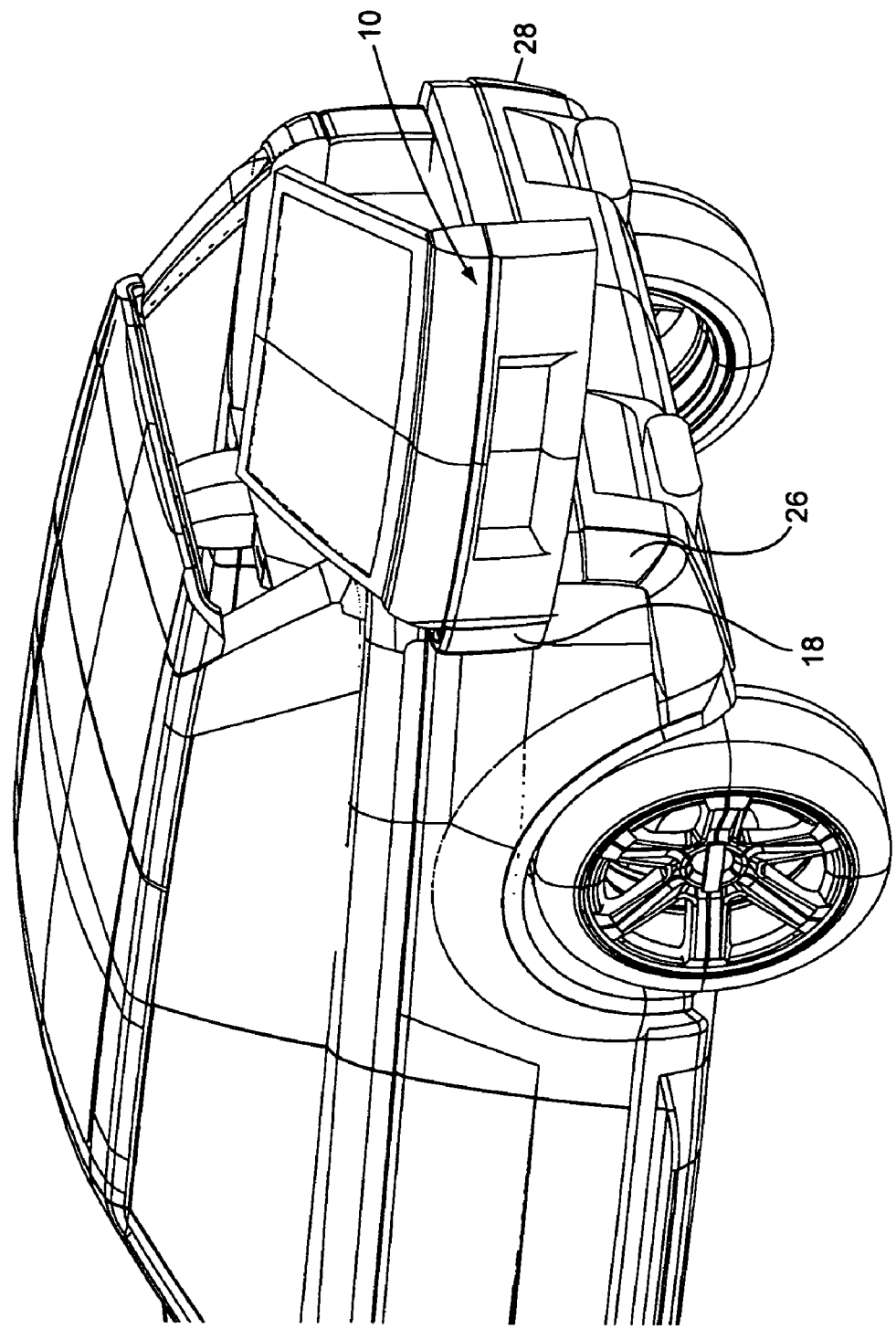
Figure 9:
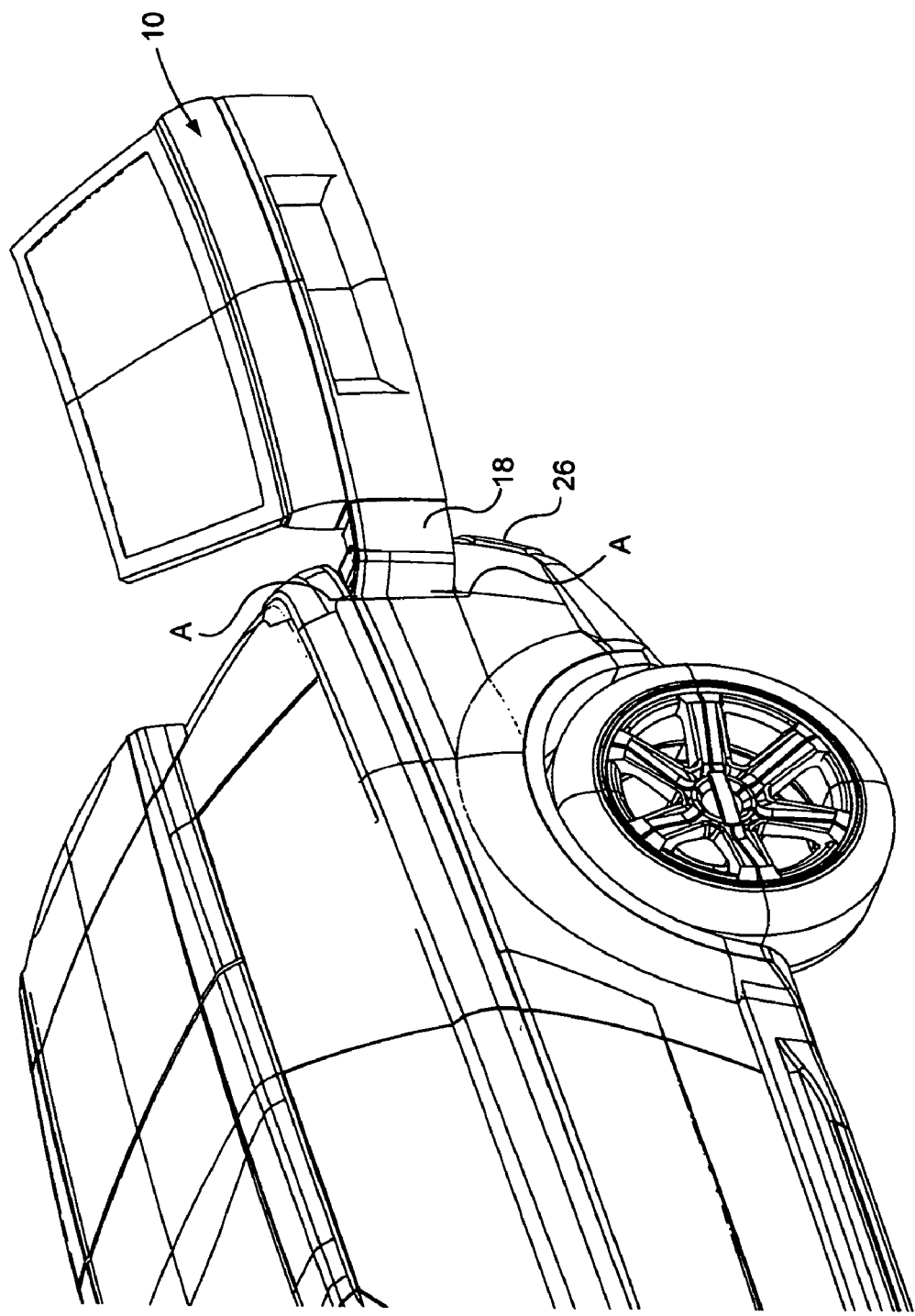

FIGS. 5 and 6 show a further embodiment, wherein the tail light 18 is horizontally subdivided and contains an upper part 18*a*, which is disposed on the hinge part connected with the tail gate 10, and a light lower part 18*b* affixed to the vehicle structure. The lower part 18*b* remains stationary when the tail gate 10 is opened.

It is understood that different sub-divisions of the tail light 18 are possible, wherein a part of the tail light is affixed to the vehicle structure, another part is affixed to the tail gate and a hinge axis extends through the tail light, respectively.

As is apparent from the protuberance shown at the left, rear corner of the vehicle of FIGS. 5 and 6, the tail gate is affixed to the left rear pillar of the vehicle by only one hinge that is combined with the tail light. According to the various requirements of the hinge opening kinematics, this hinge can be a single axis hinge, multiple axis hinge and/or a multi-link hinge.

FIGS. 7 to 15 show other vehicles that are provided with tail lights 26 and 28 in the area of the bumper covering 22, which tail lights are visible when the tail gate is opened. Similar to the embodiments according to FIGS. 1 to 6, the tail gate is again affixed to the rear pillar of the vehicle structure by a hinge on the left side. The hinge axis, about which the tail gate 10 pivots when opening the tail gate, is designated by A-A; in other respects, the same reference numerals are used in FIGS. 7 to 15 as in the preceding Figures.

In the embodiment shown in FIGS. 7 to 10, the tail light 18 is again fixedly connected with a hinge part; this hinge part is fixedly disposed on the tail gate 10 and is pivotable about the axis A-A relative to the vehicle body. It is understood that the tail gate 10 could be pivotably connected with the hinge part, which contains the tail light 18 and is pivotable relative to the vehicle body, so that the tail gate 10 would be pivotable, as a whole, about an angular range of approximately 270° on the left side of the vehicle body.

Figure 10:
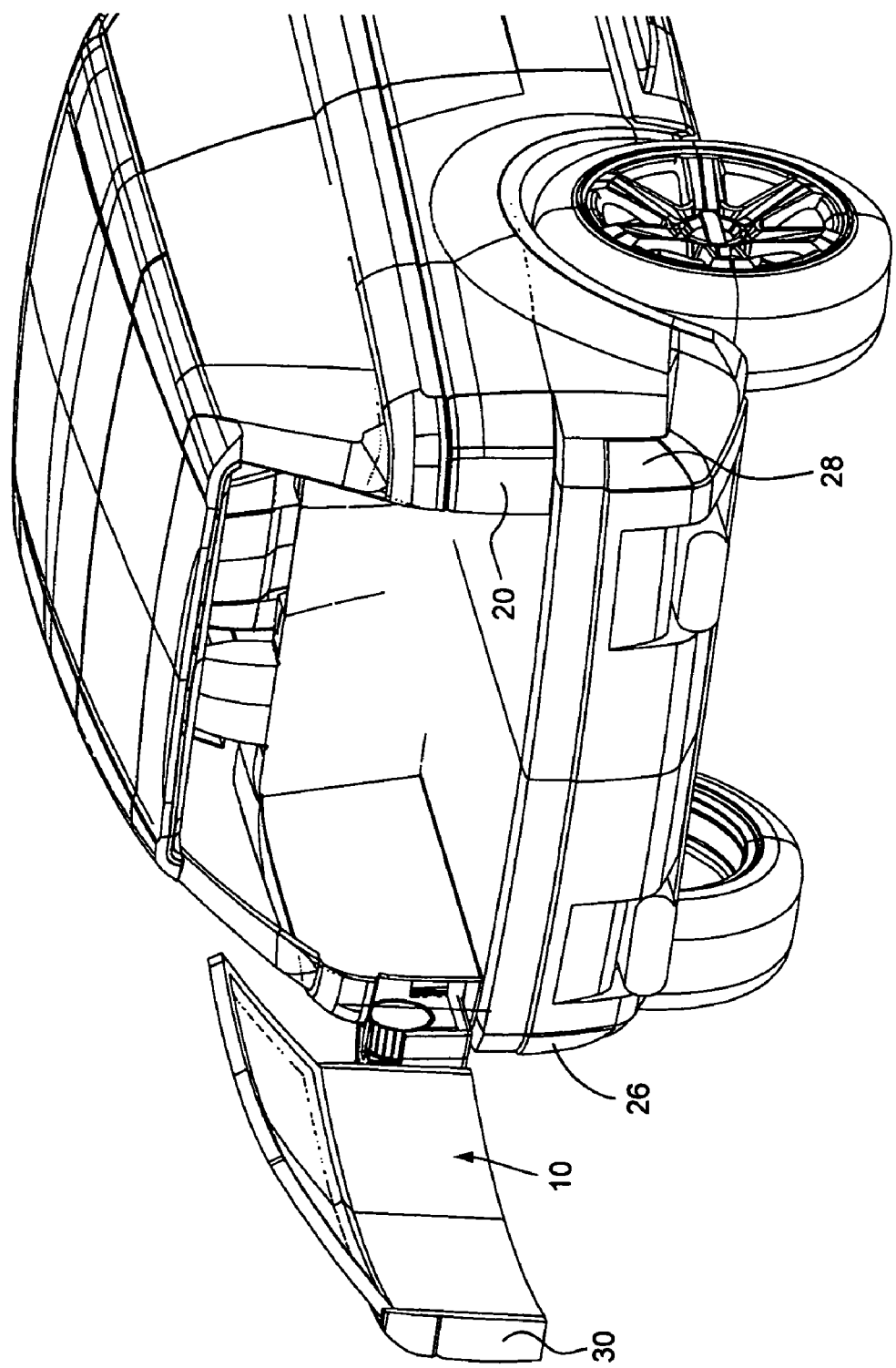
Figure 11:
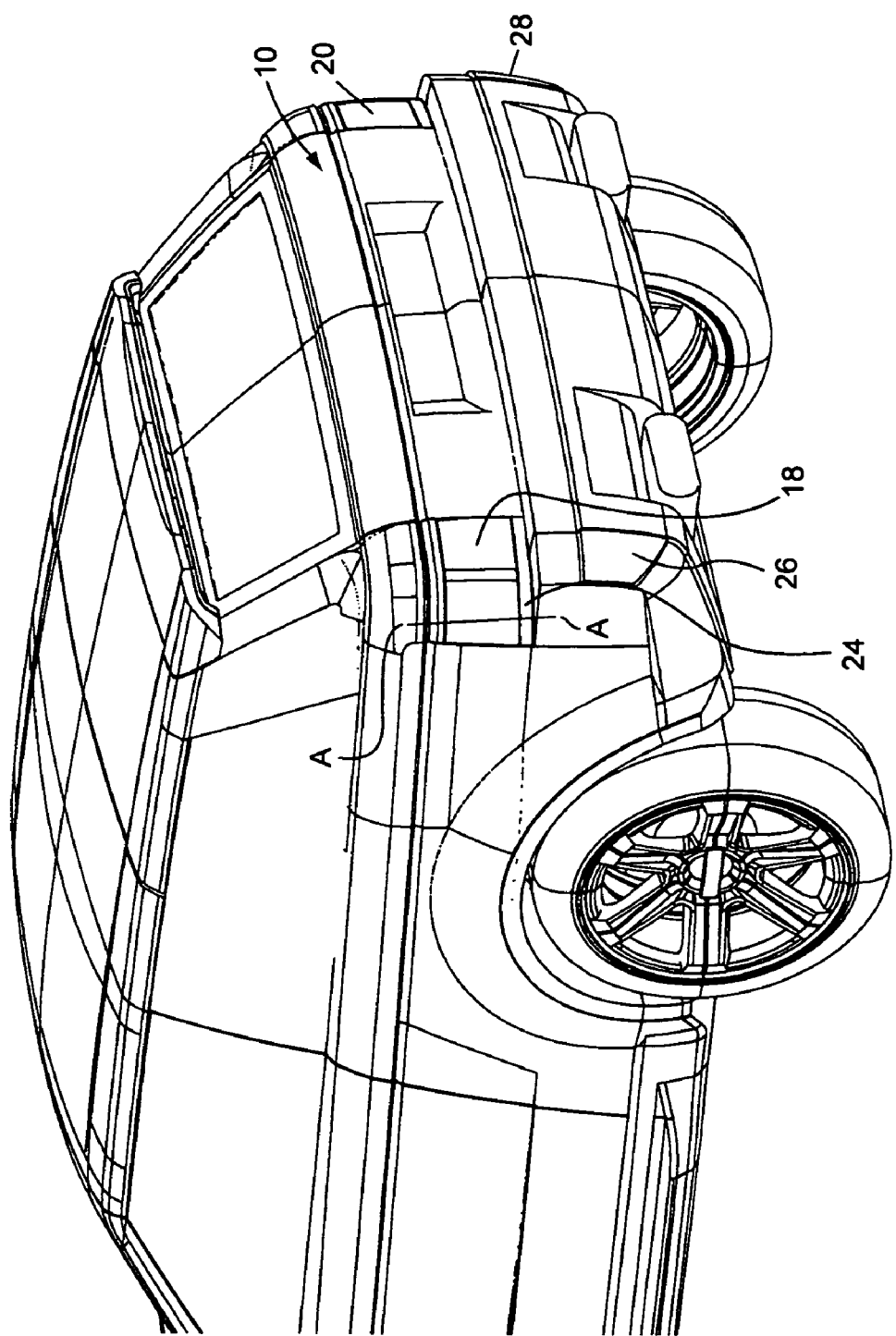
Figure 12:
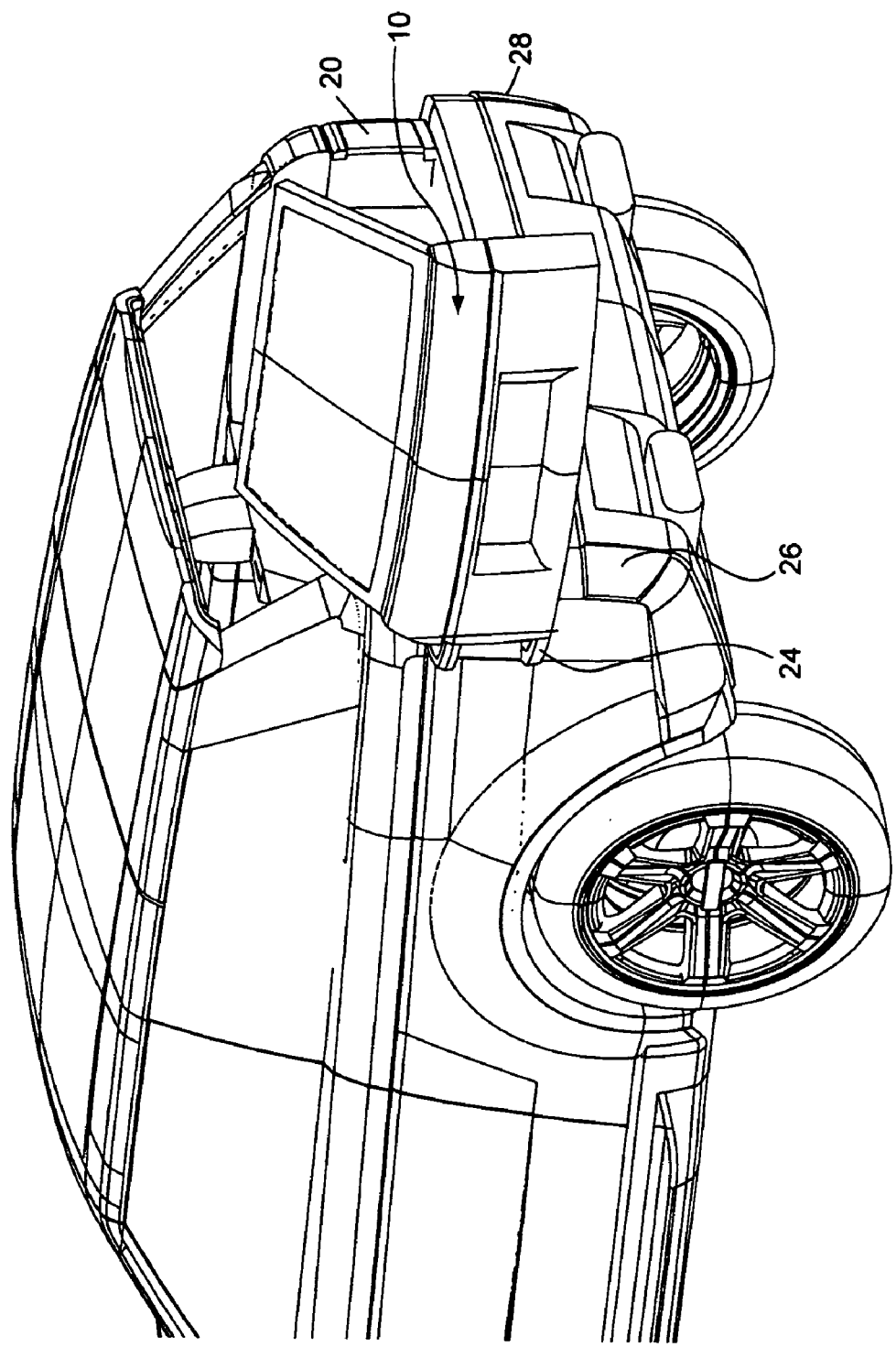
Figure 13:
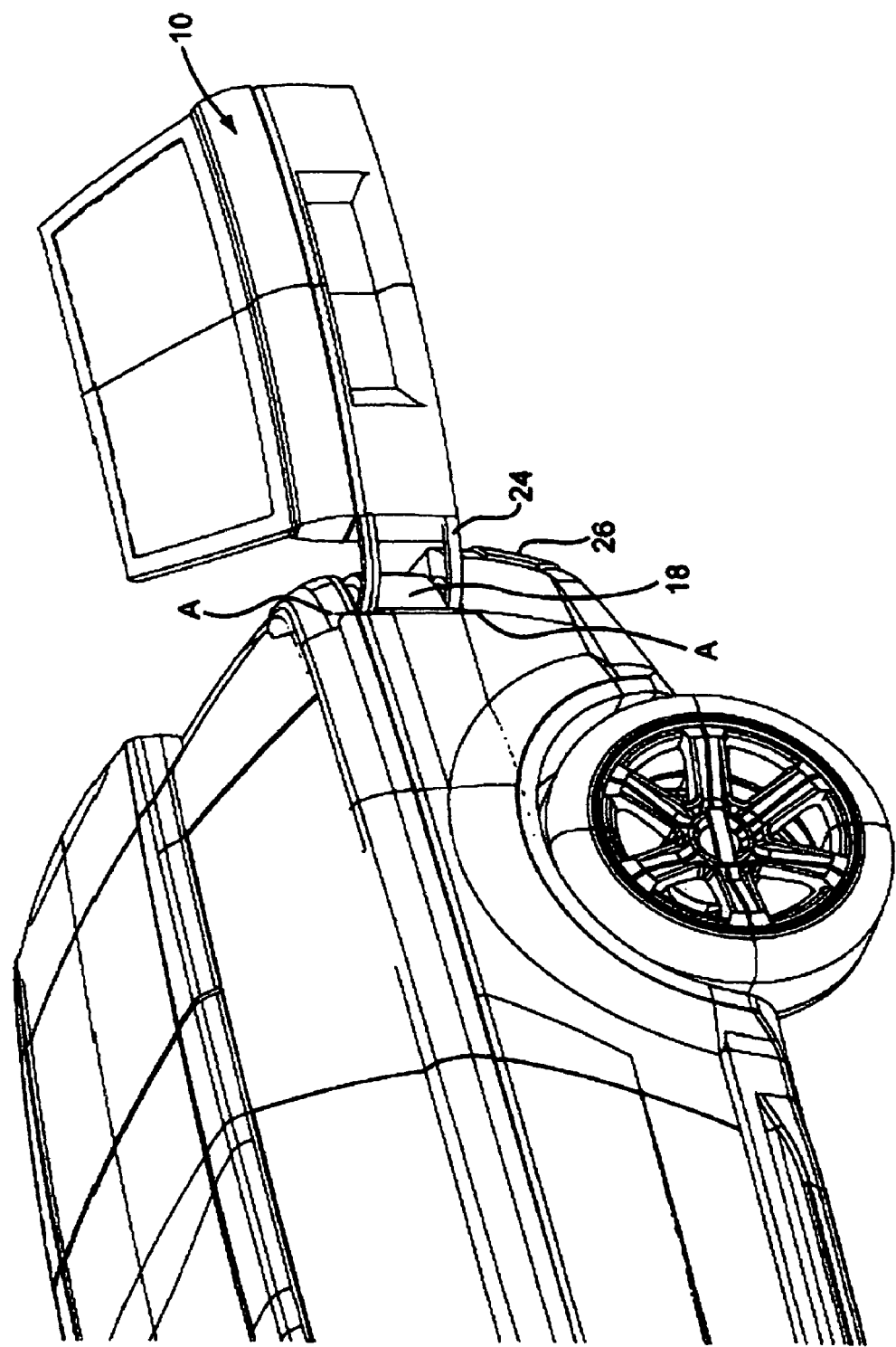
Figure 14:
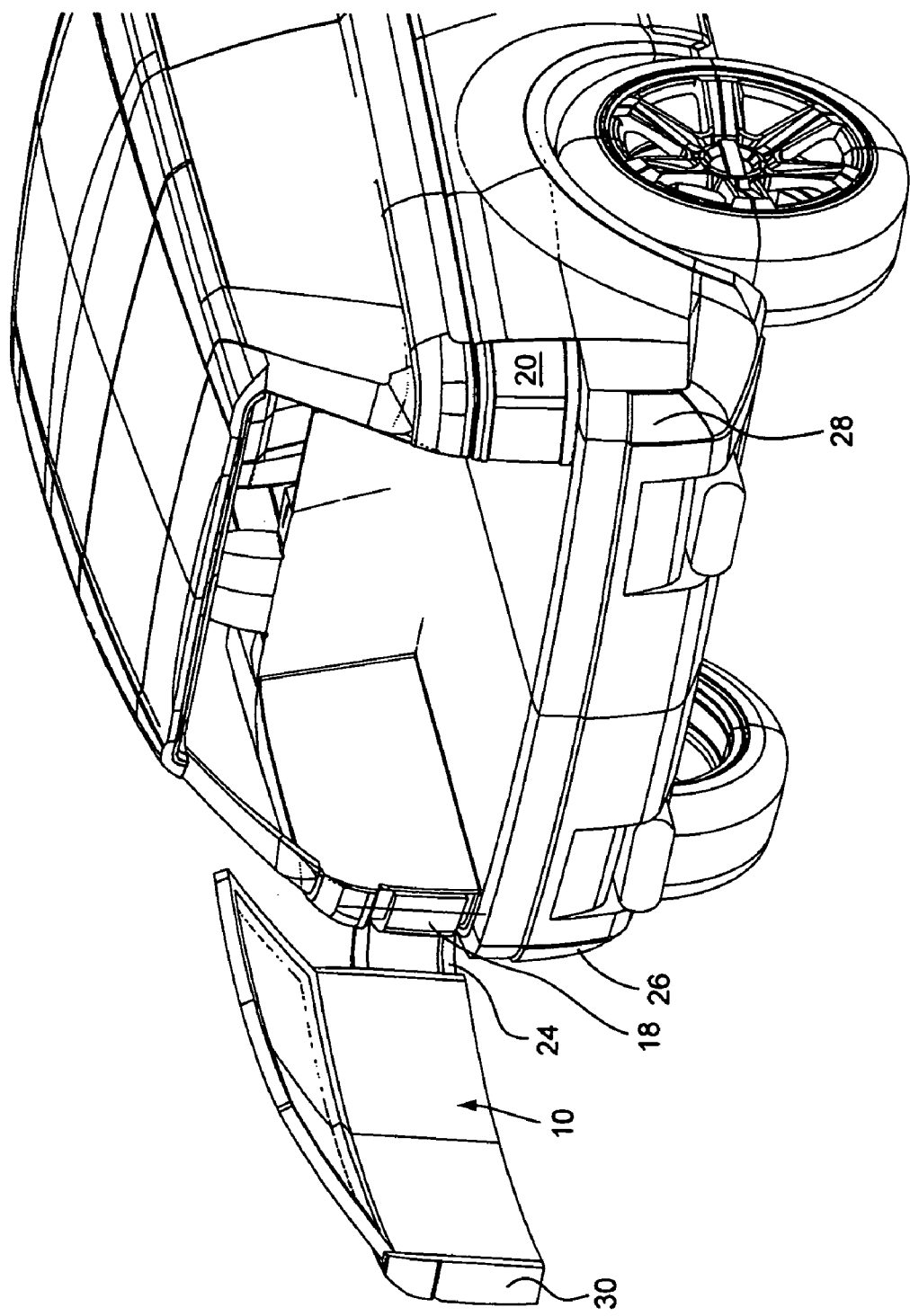
Figure 15:
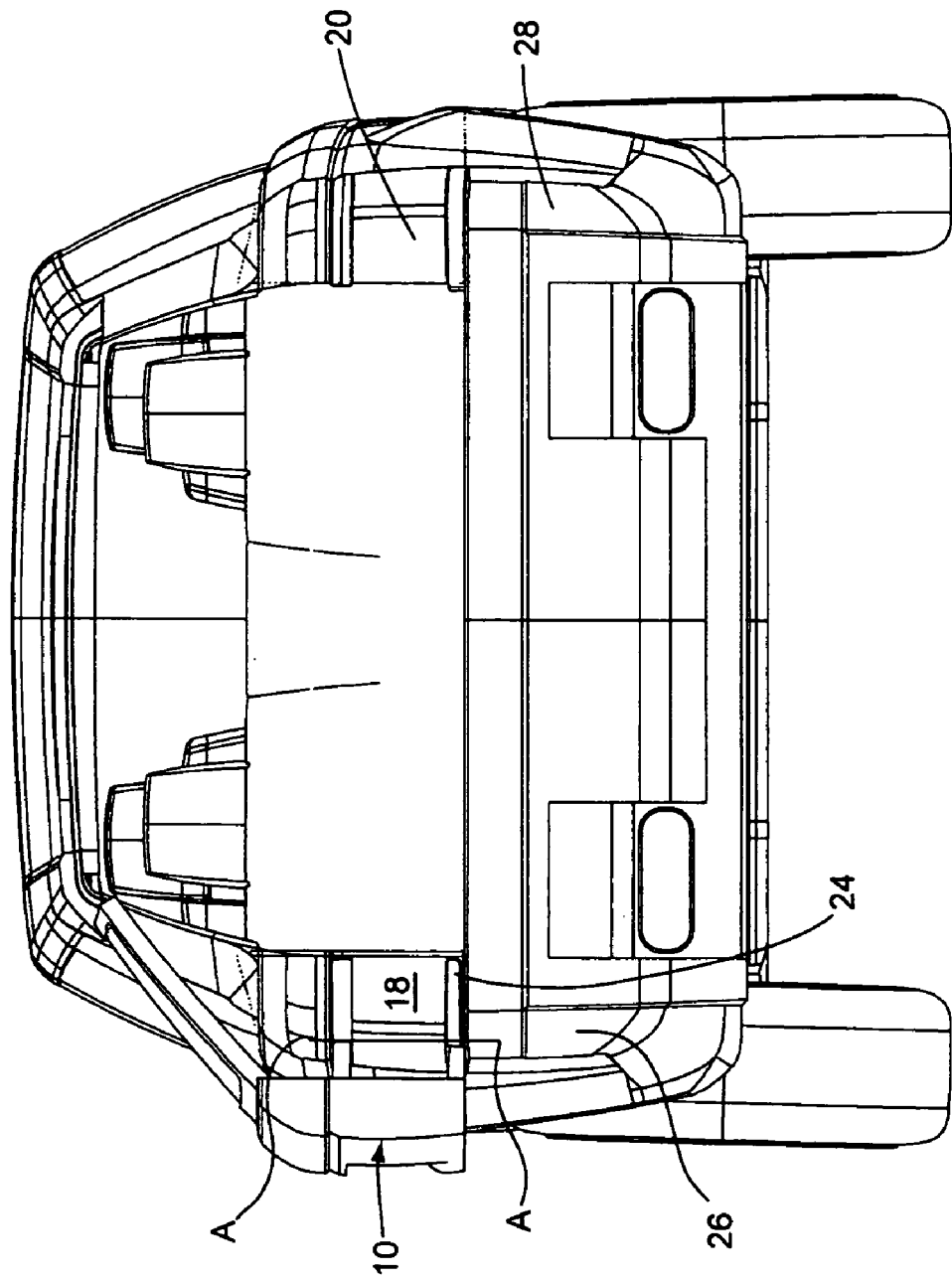

In FIG. 10, a lateral (side) area 30 of the tail gate is clearly visible, in which lateral area a tail light could be disposed in place of the tail light 26, which tail light is fully visible when the tail gate 10 is opened. In this case, the tail lights 26 and 28 could be omitted, if legally permitted.

FIGS. 11 to 14 show another embodiment of the vehicle, wherein the hinge part, which connects the tail gate with the vehicle structure, is constructed as a tail light frame 24 similar to the embodiment according to FIGS. 3 and 4; when the tail gate 10 is closed, the frame 24 surrounds the tail light 18, which is otherwise affixed to the vehicle body. It is understood that the tail lights 18 and 20 are shaped so as to be symmetric to each other, wherein the frame of the right tail light 20 does not provide any hinge function.

Figure 16:
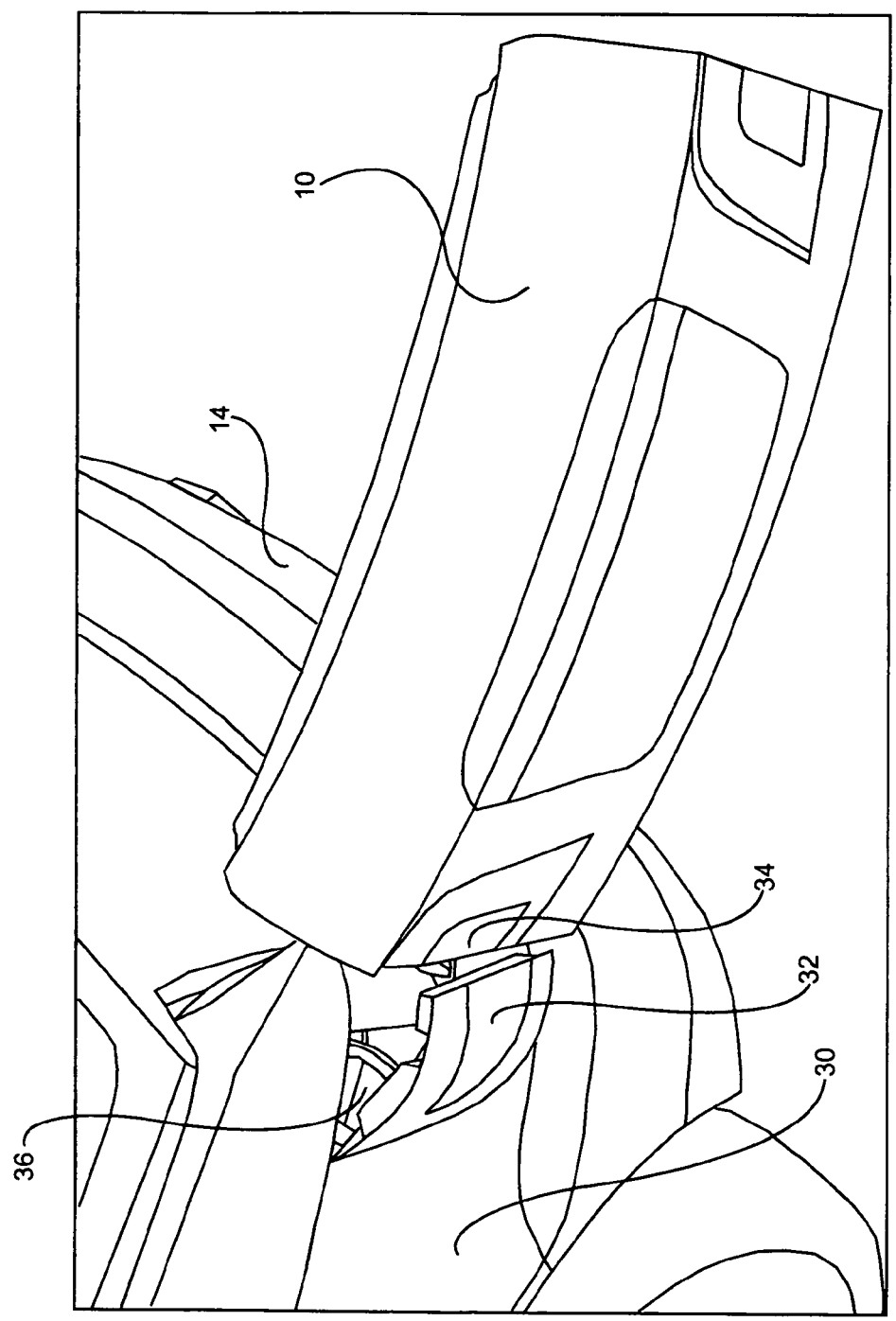
FIG. 16 shows a perspective view of a part of another embodiment of an inventive motor vehicle.

FIG. 16 shows a further embodiment of an inventive vehicle. Illustrated is a perspective view with an opened tail gate 10, which is affixed to a rear, lateral (side) body pillar and/or the rear, lateral body structure by a hinge in a manner similar to the above-described embodiments. A rear, outer body side part is designated by 30. Further, a rear, lateral (side) tail light is clearly visible in FIG. 16, which tail light is likewise affixed to the body structure by means of its own hinge so as to be pivotable about a substantially perpendicular axis and likewise swings out (pivots) when the tail gate 10 is opened and/or swung out, so that it does not stand in the way during the pivotal movement of the tail gate 10. Similar to the above-described embodiments, the tail light 32 preferably covers a notch (recess) 36 in the body side part 30 when the tail gate 10 is in the closed state. In addition, a further notch (not illustrated herein) can be provided in the outer edge area 34 of the tail gate 10.

Figure 17:
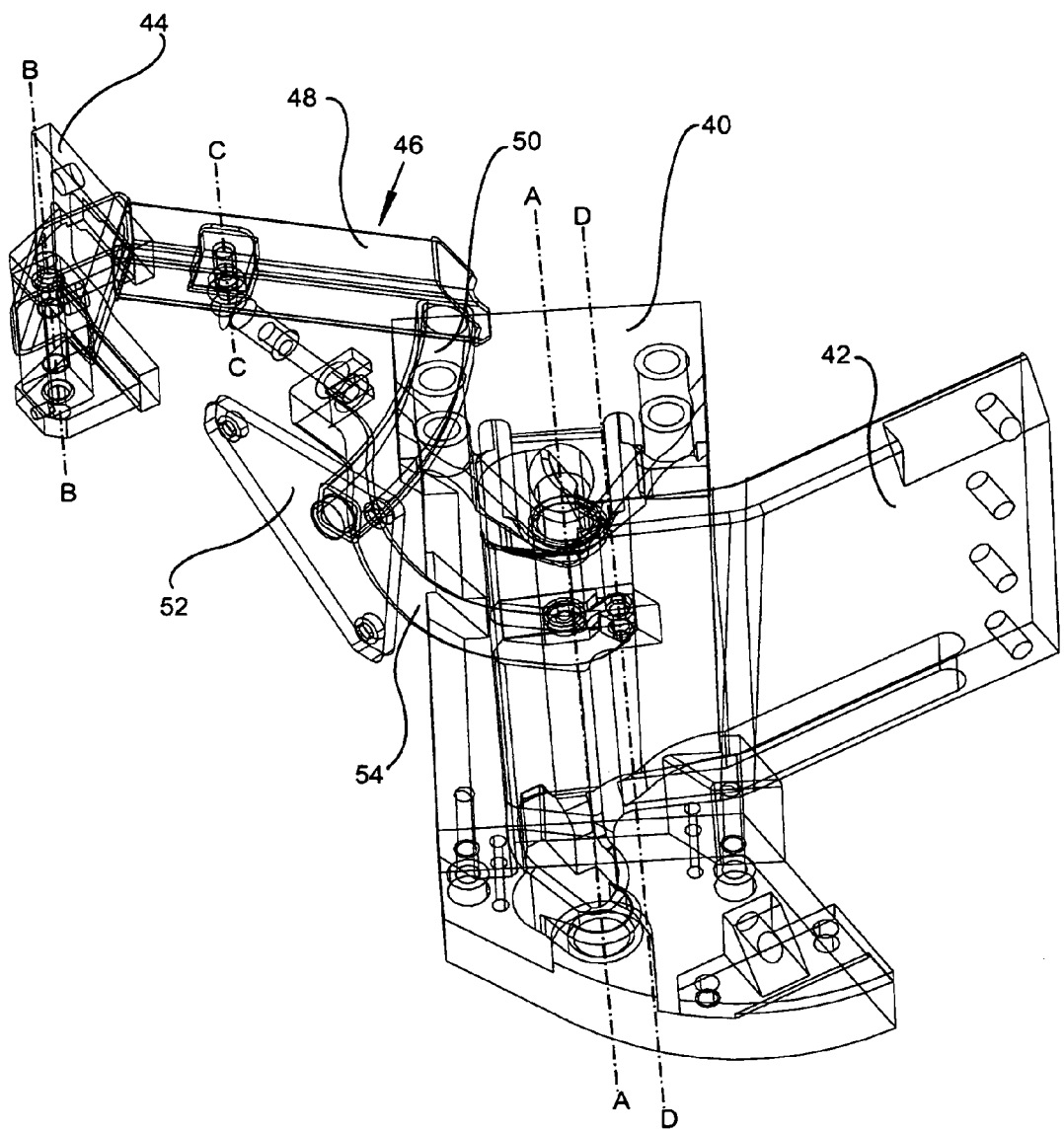
FIGS. 17 and 18 show a hinge mechanism utilized in the motor vehicle according to FIG. 16 in different positions.
Figure 18:
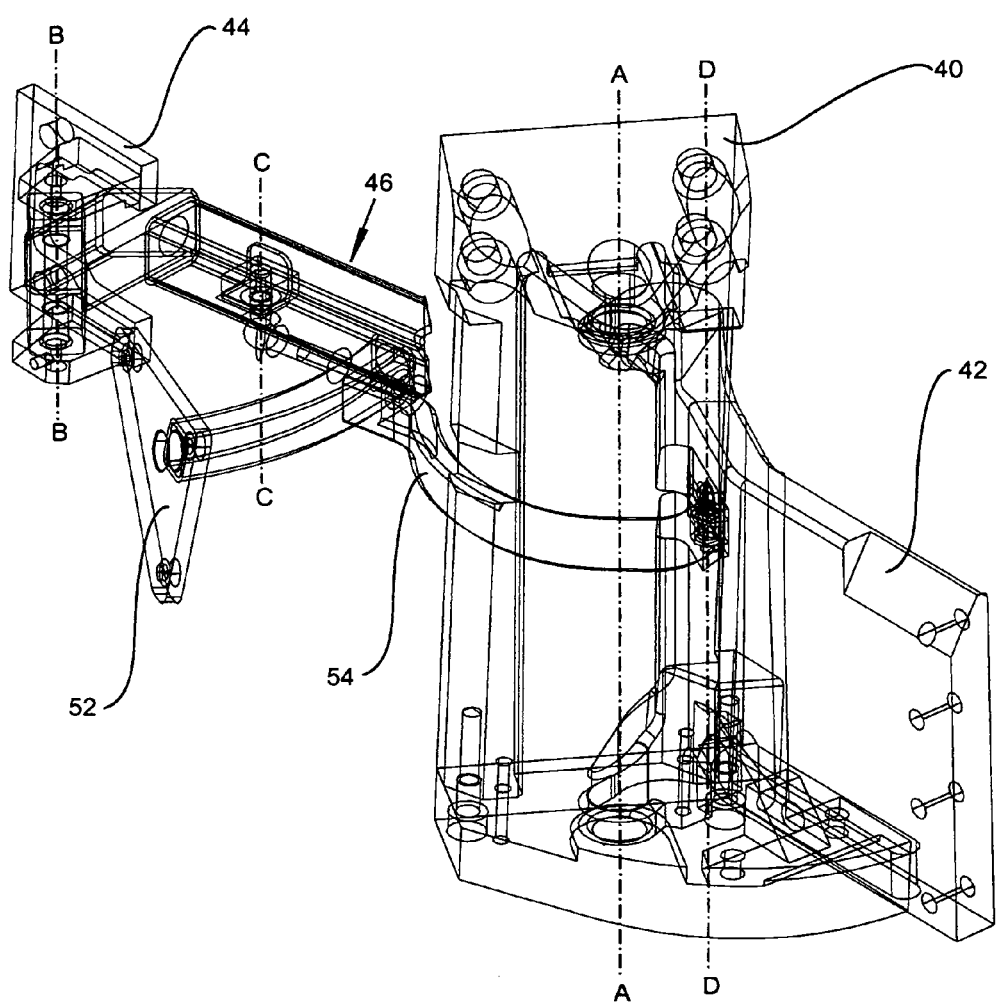

FIGS. 17 and 18 show the hinge mechanism designed to pivotably support the tail gate 10 and the tail light 32 on the body structure (not illustrated in FIGS. 17 and 18).

As shown in FIG. 17, a first hinge part 40 of a tail gate hinge is fixedly connected with the body structure, e.g., screwed or welded, and a second hinge part 42, which is pivotable on the first hinge part 40 about a pivot axis A-A, is fixedly connected with the tail gate 10 (FIG. 16); the second hinge part 42 forms a bearing bracket for the tail gate 10. The axis A-A is substantially perpendicular.

Further, a first hinge part 44 of a tail light hinge is fixedly connected with the body structure. A second hinge part 46 of the tail light hinge is pivotably supported on the first hinge part 44 so as to be pivotable about a pivot axis B-B. The rotational axis B-B is preferably located in front of and laterally outside the pivot axis A-A with respect to the vehicle longitudinal direction. The second hinge part 46 includes an arm 48 pivotably supported on the first hinge part 44. An outwardly bent arm 50 extends rearward from arm 48 and ends in a bearing bracket 52, on which bearing bracket 52 the tail light 32 is affixable.

A connecting lever 54 is connected with the first arm 48 so as to be pivotable about an axis C-C different from axis B-B; the connecting lever 54 is connected with the second hinge part 42 so as to be pivotable about an axis D-D different from axis A-A.

FIG. 17 shows the construction when the tail gate 10 is opened and the tail light 32 is pivoted inwardly. In this position, the tail light 32 covers the notch 36, in which the components 44, 48, 50, 52, 54, 40 and parts of 42 are accommodated.

FIG. 18 shows the construction with the tail gate 10 in the open position according to FIG. 16 and with the tail light 32 in the swung out or outwardly pivoted position. As is apparent, the coupling of the connecting lever 54 to the arm 48 and the second hinge part 42 is preferably provided such that, when the tail gate is opened (i.e. the second hinge part 42 is outwardly pivoted) in the clockwise direction, the second hinge part 46 also will be pivoted out of the vehicle body with the bearing bracket 52 of the tail light 32 in the clockwise direction, so that the tail light 32 does not stand in the way of (block) the opening of the tail gate 10.

The unique pivotability of the tail light 32 described with the aid of FIGS. 16 to 18 can be modified in multiple ways. For example, the tail light could be pivotably affixed on the tail gate 10. Further, the pivot axis B-B is not required to be parallel to the pivot axis A-A, but rather the tail light could, e.g., be pivoted about a substantially horizontal axis. The connecting lever 54 can be replaced by a multi-link mechanism of suitable construction, which couples the pivoting of the tail light to the pivoting and/or opening of the tail gate. In the alternative, an appropriate motorized drive can be provided for pivoting the tail light, which drive could be activated when the tail gate is opened and/or closed.

The exemplary-described invention can be further modified in multiple ways. For example, the tail gate of a vehicle could be divided in the middle and the tail gate halves could be supported on the right and left sides of the vehicle. In this case, the right side and left side tail light is formed as a hinge part or is integrated in the hinge.

In addition, an upper, third brake light is not illustrated in the figures, which is, e.g., integrated in the upper cross-bar of a rear window frame or a rear spoiler affixed to the vehicle.

Each of the features and teachings disclosed above may be utilized separately or in conjunction with other features and teachings to provide improved motor vehicles and tail gates for vehicles. Representative examples of the present invention, which examples utilize many of these additional features and teachings both separately and in conjunction, were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above-noted detail description may not be necessary to practice the invention in the broadest sense, and are instead taught merely to particularly describe representative examples of the invention. Further, various features of the representative examples and the dependent claims may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Tail Gate
12 Rear Window
14 Bumper
16 Gate Body
18 Tail Light
20 Tail Light
22 Bumper Covering
24 Frame
26 Tail Light
28 Tail Light
30 Body Side Part
32 Tail Light
34 Outer Edge Area
36 Notch
40 First Hinge Part
42 Second Hinge Part
44 First Hinge Part
46 Second Hinge Part
48 Arm
50 Arm
52 Bearing Bracket
54 Connecting Lever

We claim:

1. A vehicle comprising:
   a tail gate affixed to a lateral, rear pillar of a vehicle body by a hinge so as to be pivotable about a substantially vertical axis,
   wherein the hinge comprises a hinge part that is arranged and constructed to swing out together with the tail gate and is located in the area of a lateral tail light of the vehicle when the tail gate is closed,
   wherein the lateral tail light is pivotably attached to the vehicle body so as to be pivotable about a substantially vertical axis when the tail gate is pivoted, and wherein the tail light is fully contained in said hinge part.

2. A vehicle according to claim 1, wherein the tail gate is affixed to the vehicle structure by only one hinge.

3. A vehicle according to claim 1, further comprising a second lateral tail light located adjacent to said lateral tail light in a closed state of the tail gate,
   wherein said hinge part includes a frame surrounding the second lateral tail light in the closed state of the tail gate, and wherein the second lateral tail light is affixed to the vehicle body and remains stationary when the tail gate is opened.

4. A vehicle according to claim 1, wherein said hinge part forms a part of the tail light.

5. A vehicle according to claim 1, further including a further tail light disposed on the hinge side of the tail gate, which tail light is freely visible from the rear when the tail gate is disposed in the opened position.

6. A vehicle comprising:
   a vehicle body,
   a first tail light structure fixedly connected to the vehicle body,
   a tail gate, a hinge pivotably coupling the tail gate to the vehicle body, such that the tail gate is pivotable about a substantially vertical axis, and a second tail light structure at least partially incorporated with the hinge, the second tail light structure being disposed on the opposite lateral side of the vehicle body with respect to the first tail light structure;

wherein the hinge comprises:

a tail gate hinge comprising a first gate hinge part fixedly connected with the vehicle body and a second gate hinge part forming a first bearing bracket that is fixedly connected to the tail gate, the second gate hinge part being pivotably connected to the first gate hinge part, and a tail light hinge comprising a first light hinge part fixedly connected with the vehicle body and a second light hinge part pivotably connected to the first light hinge part and being coupled to the second tail light structure;

wherein the second light hinge part includes a first arm pivotably supported on the first light hinge part;

further comprising a second arm extending from the first arm and supporting a second bearing bracket, at least a part of the second tail light structure being affixed to the second bearing bracket.

7. A vehicle according to claim 6, wherein the second tail light structure comprises:

a light fixture fixedly connected to the vehicle body, and a frame fixedly connected to the hinge so as to pivot therewith, the frame at least partially surrounding the light fixture when the tail gate is disposed in a closed position.

8. A vehicle according to claim 7, wherein the frame completely surrounds the light fixture when the tail gate is disposed in the closed position.

9. A vehicle according to claim 6, wherein the second tail light structure comprises a light fixture fixedly connected to the tail gate.

10. A vehicle according to claim 6, further comprising a connecting lever pivotably connected to the first arm and pivotably connected to the second gate hinge part.

11. A vehicle according to claim 10, further comprising a recess in the vehicle body arranged and constructed to receive the hinge and the second tail light structure when the tail gate is disposed in a closed position.

12. A vehicle according to claim 11, wherein the tail light is arranged and disposed so as not to block opening and closing of the tail gate.

13. A vehicle according to claim 12, wherein the second tail light structure comprises:

a light fixture fixedly connected to the vehicle body, and
a frame fixedly connected to the light bearing bracket so as to pivot therewith, the frame at least partially surrounding the light fixture when the tail gate is disposed in the closed position.

* * * * *